United States Patent [19]
Kamiya

[11] Patent Number: 5,618,459
[45] Date of Patent: Apr. 8, 1997

[54] HIGH-SPEED BUS APPARATUS WITH COOLING MEANS

[75] Inventor: Hiroshi Kamiya, Tokyo, Japan

[73] Assignee: NEC Corporation, Tokyo, Japan

[21] Appl. No.: 336,214

[22] Filed: Nov. 3, 1994

[30] Foreign Application Priority Data

Nov. 4, 1993 [JP] Japan ................................. 5-298906

[51] Int. Cl.⁶ ............................................. H05B 1/02
[52] U.S. Cl. ........................... 219/497; 219/501; 219/494; 219/508; 361/695; 165/80.2
[58] Field of Search ...................... 219/209, 210, 219/497, 494, 501, 505, 508, 491; 361/384, 687, 695, 691, 696; 165/40, 80.3, 49.3, 80.2, 3, 22, 14

[56] References Cited

U.S. PATENT DOCUMENTS

| | | | |
|---|---|---|---|
| 4,739,382 | 4/1988 | Blouke et al. | 357/28 |
| 4,881,591 | 11/1989 | Rignall | 165/26 |
| 5,020,138 | 5/1991 | Yasuda et al. | 455/155 |
| 5,121,291 | 6/1992 | Cope et al. | 361/384 |
| 5,477,417 | 12/1995 | Ohmori et al. | 361/695 |
| 5,484,012 | 1/1996 | Hiratsuka | 361/695 |
| 5,491,610 | 2/1996 | Mok et al. | 361/695 |

FOREIGN PATENT DOCUMENTS

| | | |
|---|---|---|
| 61-201313 | 9/1986 | Japan . |
| 61-251918 | 11/1986 | Japan . |
| 61-204213 | 12/1986 | Japan . |
| 62-62312 | 4/1987 | Japan . |
| 63-19020 | 1/1988 | Japan . |
| 4-240904 | 8/1992 | Japan . |

*Primary Examiner*—Mark H. Paschall
*Attorney, Agent, or Firm*—Young & Thompson

[57] ABSTRACT

In a high-speed bus apparatus, a thermodetector having a Peltier device embedded in a casing of the apparatus senses a temperature around the casing and sends the resulting output thereof to a switch-equipped current detector. In response, the switch-equipped current detector compares the temperature around the casing with a predetermined reference temperature. Based on the result of comparison, the switch-equipped current detector causes a cooling fan to selectively turn on or turn off such that the temperature around the casing remains at the reference temperature. As a result, temperature around a device received in the casing and adaptive to a high-speed bus is maintained substantially at an optimal temperature for high-speed transmission over a bus.

6 Claims, 4 Drawing Sheets

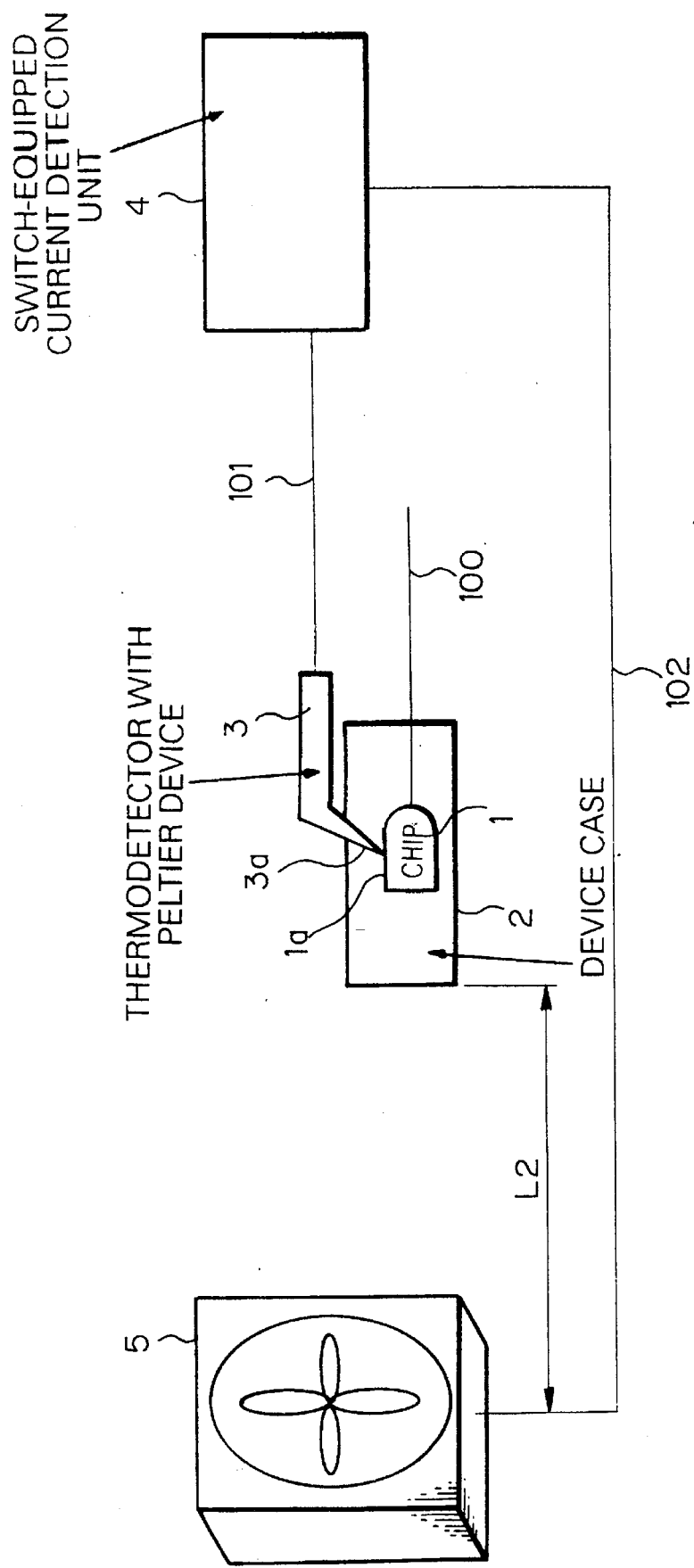

HIGH-SPEED BUS APPARATUS WITH COOLING MEANS

BACKGROUND OF THE INVENTION

1. Field of the Invention

The present invention relates to a high-speed bus apparatus and, more particularly, to a high-speed bus apparatus capable of controlling temperature around a device thereof which is adaptive to a high-speed bus and has an optimal junction temperature for high-speed transmission over a bus.

2. Description of the Related Art

It has been customary with a high-speed bus apparatus, as with an ordinary IC (Integrated Circuit) device, to cool the inside of a casing in order to maintain it at an operable temperature or to cool a CPU (Central Processing Unit) by, for example, a heat sink in order to maintain it in an operable temperature environment. However, despite the fact that an optimal temperature for high-speed transmission over a bus exists, the conventional high-speed bus apparatus lacks a mechanism for controlling the actual junction temperature to the optimal temperature. With the conventional apparatus, therefore, it is difficult to implement high-speed transfer over a bus.

SUMMARY OF THE INVENTION

It is, therefore, an object of the present invention to provide a high-speed bus apparatus capable of controlling the actual junction temperature of a device for a high-speed bus to an optimal temperature for high-speed transmission over a bus, thereby realizing high-speed transmission over a bus.

In accordance with the present invention, a high-speed bus apparatus for a high-speed bus and said high-speed bus apparatus having optimal junction temperature for early setting of signals over the high-speed bus and having a temperature sensing device including a thermodetector having a Peltier device for sensing the junction temperature of the device, a cooling device for cooling the apparatus, and a control device for controlling the cooling device such that the junction temperature of the apparatus remains at the optimal junction temperature, are disclosed.

BRIEF DESCRIPTION OF THE DRAWINGS

The above and other objects, features and advantages of the present invention will become more apparent from the following detailed description taken with the accompanying drawings in which:

FIGS. 3 and 4 are schematic block diagrams each showing an alternative embodiment of the present invention.

In the figures, the same or similar constituent parts are designated by the same reference numerals.

DESCRIPTION OF THE PREFERRED EMBODIMENTS

Figure 1:
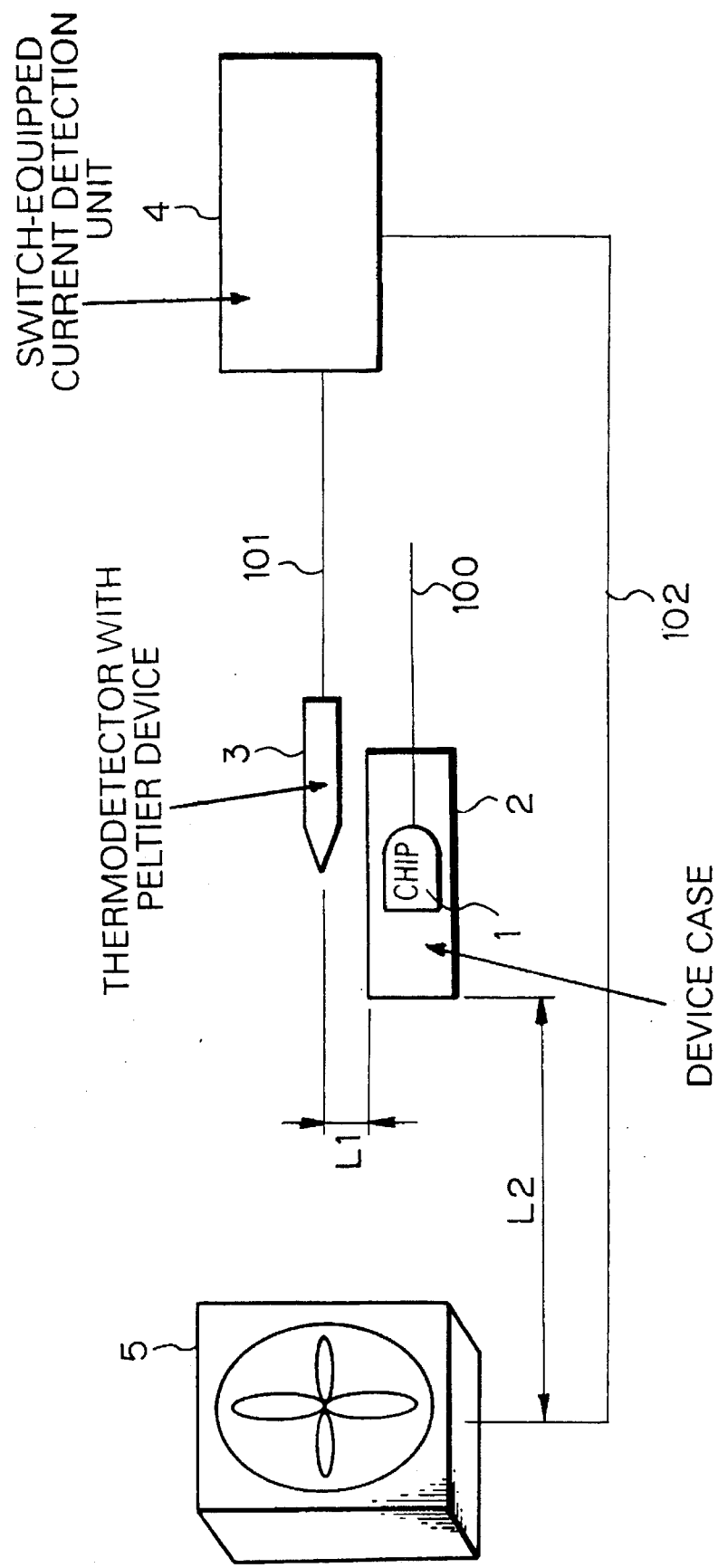
FIG. 1 is a block diagram schematically showing a high-speed bus apparatus embodying the present invention.
Figure 2:
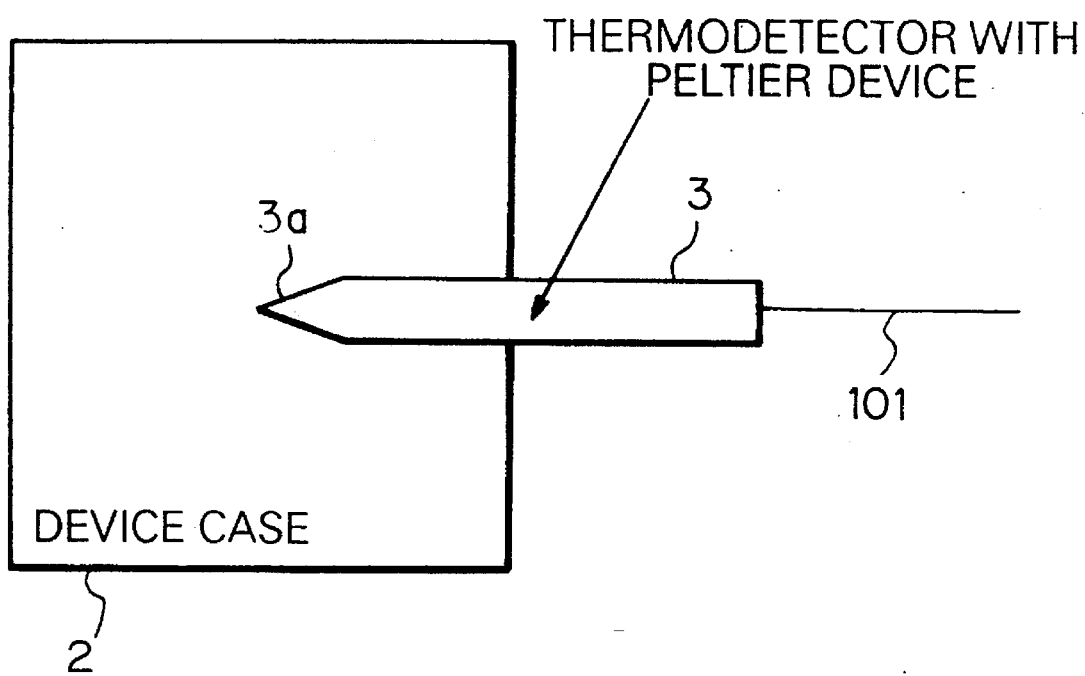
FIG. 2 is a plan view of a casing and a thermodetector included in the embodiment.
Figure 3:
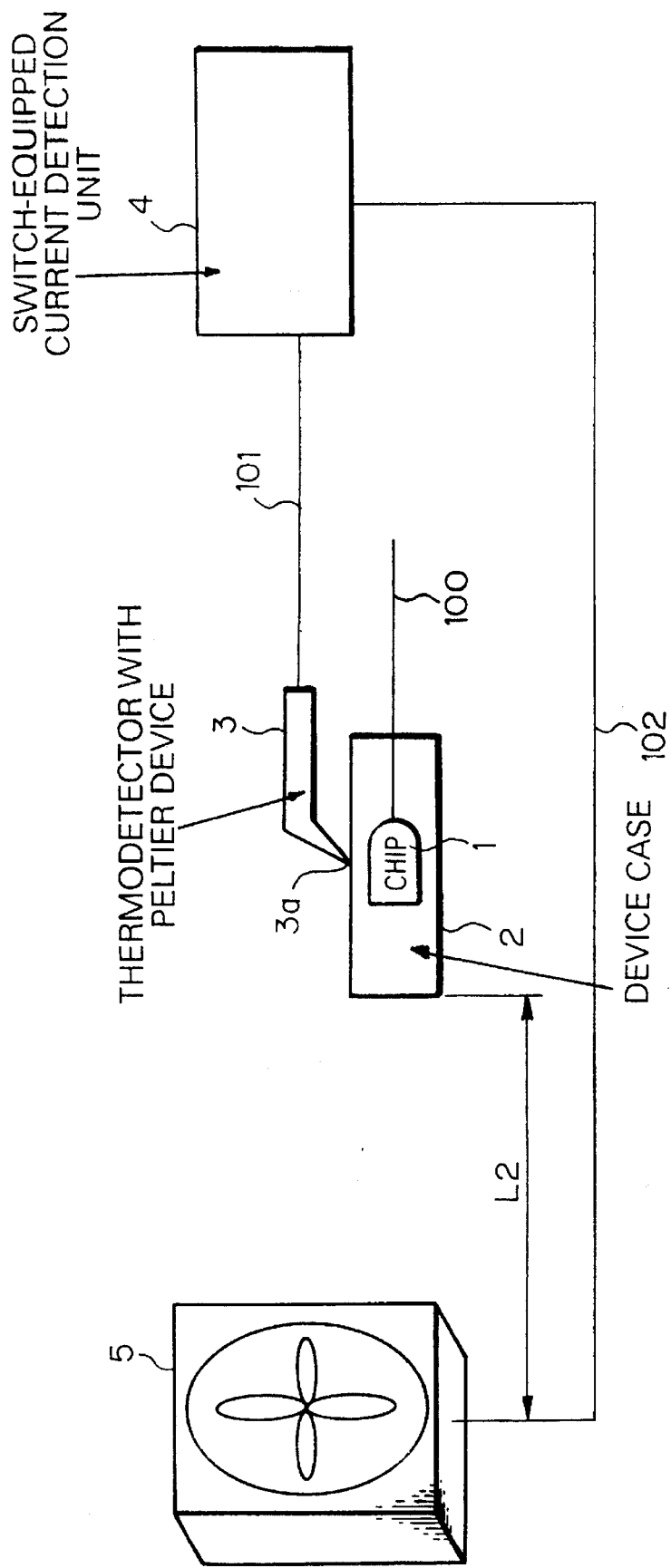

Referring to FIGS. 1 and 2, a high-speed bus apparatus embodying the present invention is shown. As shown, a device 1 adaptive to a high-speed bus is accommodated in a casing 2 and connected to a bus 100. A thermodetector 3 including a Peltier device embedded in the casing of the device is set such that a terminal 3a thereof is positioned at the center of the casing 2 (see FIG. 2) and spaced a distance L1 substantially 2 millimeters above the upper surface of the casing 2 (see FIG. 1). A Peltier device is a device relying upon the Peltier effect. The Peltier effect is the production or absorption of heat at the junction of two metals when a current is passed through the junction. Heat generated by current in one direction will be adsorbed when the current is reversed. The thermodetector 3 is connected to a switch-equipped current detector by a two-core cable 101. The selfequipped current detector 4 is connected to a cooling fan 5 by a control line 102. The selfequipped current detector 4 selectively turns on or turns off the fan 5 in response to temperature data received from the thermodetector 3 via the cable 101. The cooling fan 5 is located at a distance L2 of substantially 50 millimeters from the side of the casing 2 which is closest to the fan 5. The fan 5 selectively turns on or turns off in response to control data sent from the switching-equipped current detector 4 over the control line 102.

Parameters constituting the device 1 include temperature dependency. As the temperature around the device 1 changes, the parameters of the device 1 are changed to, in turn, change the delay of the device, among others. It follows that an optimal temperature for the device 1 exists which realizes high-speed transmission over the bus 100 without changing the delay of the device 1 or any other factors. Assuming that the optimal temperature is T ° C., then temperature around the device 1 can be maintained at T ° C. if T ° C. is set in the switch-equipped current detector 4 as a reference temperature.

In the illustrative embodiment, the switch-equipped current detector 4 compares the temperature around the casing 2 received from the thermodetector 3 with the reference temperature T ° C. Based on the result of comparison, the switch-equipped current detector 4 sends control data to the cooling fan 5 over the control line 102 such that the fan 5 turns on or turns off to set up the temperature T ° C. around the casing 2. Specifically, if the temperature around the casing 2 is higher than the reference temperature T ° C., the switch-equipped current detector 4 causes the fan 5 to turn on via the control line 102, thereby cooling the casing 2. As a result, the temperature around the device 1 received in the casing 2 is lowered. Conversely, if the temperature around the casing 2 is lower than the reference temperature T ° C., the switch-equipped current detector 4 causes the fan 5 to turn off via the control line 102. Consequently, the fan 5 stops cooling the casing 2 and allows the temperature around the device 1 in the casing 2 to rise.

The switch-equipped current detector 4 repeats the above operation in response to the output of the thermodetector 3 representing the varying temperature around the casing 2. This successfully maintains the temperature around the device 1 at T ° C. which is optimal for the high-speed transmission over the bus 100.

FIG. 2 shows an alternative embodiment of the present invention. As shown, this embodiment is identical with the previous embodiment except that the terminal 3a of the thermodetector 3 having a Peltier device embedded in the casing 2 of the device contacts the tipper surface of the casing 2. In this condition, the thermodetector 3 senses the temperature of the upper surface of the casing 2. The switch-equipped current detector 4 compares the temperature of the upper surface of the casing 2 received from the thermodetector 3 with the reference temperature T ° C. Based on the result of comparison, the switch-equipped current detector 4 sends control data to the fan 5 over the control line 102 such that the fan 5 turns on or turns off to lower or raise the temperature of the casing 2 to the optimal temperature T ° C. Specifically, if the temperature of the upper surface of the casing 2 is higher than the reference temperature T ° C., the switch-equipped current detector 4 causes the fan 5 to turn on via the control line 102, thereby cooling the casing 2. Conversely, if the temperature of the upper surface of the casing 2 is lower than the reference temperature T ° C., the switch-equipped current detector 4 causes the fan 5 to turn off via the control line 102. Consequently, the fan 5 stops cooling the casing 2 and allows the temperature of the casing 2 to rise.

Again, the switch-equipped current detector 4 repeats the above operation in response to the output of the thermocouple 3 representing the varying temperature of the tipper surface of the casing 2. This successfully maintains the temperature of the device 1 at T ° C. which is optimal for high-speed transmission over the bus 100.

Referring to FIG. 4, another alternative embodiment of the present invention will be described. As shown, this embodiment is also identical with the embodiment shown in FIGS. 1 and 2 except that the terminal 3a of the thermodetector 3 having the Peltier device embedded in the casing 2 of the device contacts a junction portion 1a included in the device 1. In this condition, the thermodetector 3 senses the temperature of the junction portion 1a of the device 1. The switch-equipped current detector 4 compares the junction temperature of the device 1 received from the thermodetector 3 with the reference temperature T ° C. Based on the result of comparison, the switch-equipped current detector 4 sends control data to the cooling fan 5 over the control line 102 such that the fan 5 turns on or turns off to lower or raise the temperature of the junction portion 1a to the optimal temperature T ° C. Specifically, if the junction temperature is higher than the reference temperature T ° C., the switch-equipped current detector 4 causes the fan 5 to turn on via the control line 102, thereby cooling the casing 2. Conversely, if the junction temperature is lower than the reference temperature T ° C., the switch-equipped current detector 4 causes the fan 5 to turn off via the control line 102. Consequently, the fan 5 stops cooling the casing 2 and allows the temperature of the casing 2 to rise.

The switch-equipped current detector 4 repeats the above operation in response to the output of the thermocouple 3 representing the varying temperature of the junction portion 1a of the device 1. This successfully maintains the junction temperature of the device 1 at T ° C. which is optimal for high-speed transmission over the bus 100.

In summary, it will be seen that the present invention provides a high-speed bus apparatus which senses the junction temperature of a device adaptive to a high-speed bus and having an optimal junction temperature for implementing high-speed transmission over the bus, and selectively cools, based on the sensed temperature, the device in order to maintain the junction temperature at the optimal temperature. With such an apparatus, it is possible to control the junction temperature of the device to the optimal temperature for high-speed transmission over a bus and, therefore, to implement the high-speed transmission itself.

Various modifications will become possible for those skilled in the art after teachings of the present disclosure without departing from the scope thereof.

What is claimed is:

1. A high-speed bus apparatus for a high-speed bus said high speed apparatus having an optimal junction temperature for early settling of signals on said high-speed bus, said apparatus comprising:

temperature sensing means for sensing a junction temperature of said apparatus, said temperature sensing means comprising a thermodetector having a Peltier device embedded in a casing accommodating said apparatus;

cooling means for cooling said apparatus; and control means for controlling said cooling means such that the junction temperature of said apparatus remains at the optimal junction temperature.

2. An apparatus as claimed in claim 1, wherein said temperature sensing means senses a temperature around said casing, said control means controlling said cooling means such that the temperature around said casing remains at the optimal junction temperature.

3. An apparatus as claimed in claim 2 wherein said thermodetector is spaced a predetermined distance from an upper surface of said casing.

4. An apparatus as claimed in claim 1, wherein said temperature sensing means senses a temperature of an upper surface of said casing, said control means controlling said cooling means such that the temperature of said upper surface of said casing remains at said optimal junction temperature.

5. An apparatus as claimed in claim 4, wherein said thermodetector comprises a terminal contacting upper surface of said casing.

6. An apparatus as claimed in claim 4, wherein said thermodetector comprises a terminal contacting a junction portion of said apparatus.

\* \* \* \* \*